J. McSWEENY.
SAW SHARPENING MACHINES.

No. 181,795. Patented Sept. 5, 1876.

Witnesses:
F. W. Howard
John D. Center

Inventor:
James McSweeny
by A. M. Smith,
Attorney.

UNITED STATES PATENT OFFICE.

JAMES McSWEENY, OF PITTSFIELD, MASSACHUSETTS.

IMPROVEMENT IN SAW-SHARPENING MACHINES.

Specification forming part of Letters Patent No. 181,795, dated September 5, 1876; application filed January 20, 1876.

*To all whom it may concern:*

Be it known that I, JAMES McSWEENY, of Pittsfield, county of Berkshire, State of Massachusetts, have invented a certain new and useful Improvement in Machines for Filing and Gumming Saws, of which the following is a full, clear, and exact description, reference being had to the accompanying drawings, making part of this specification, in which—

Figure 1:
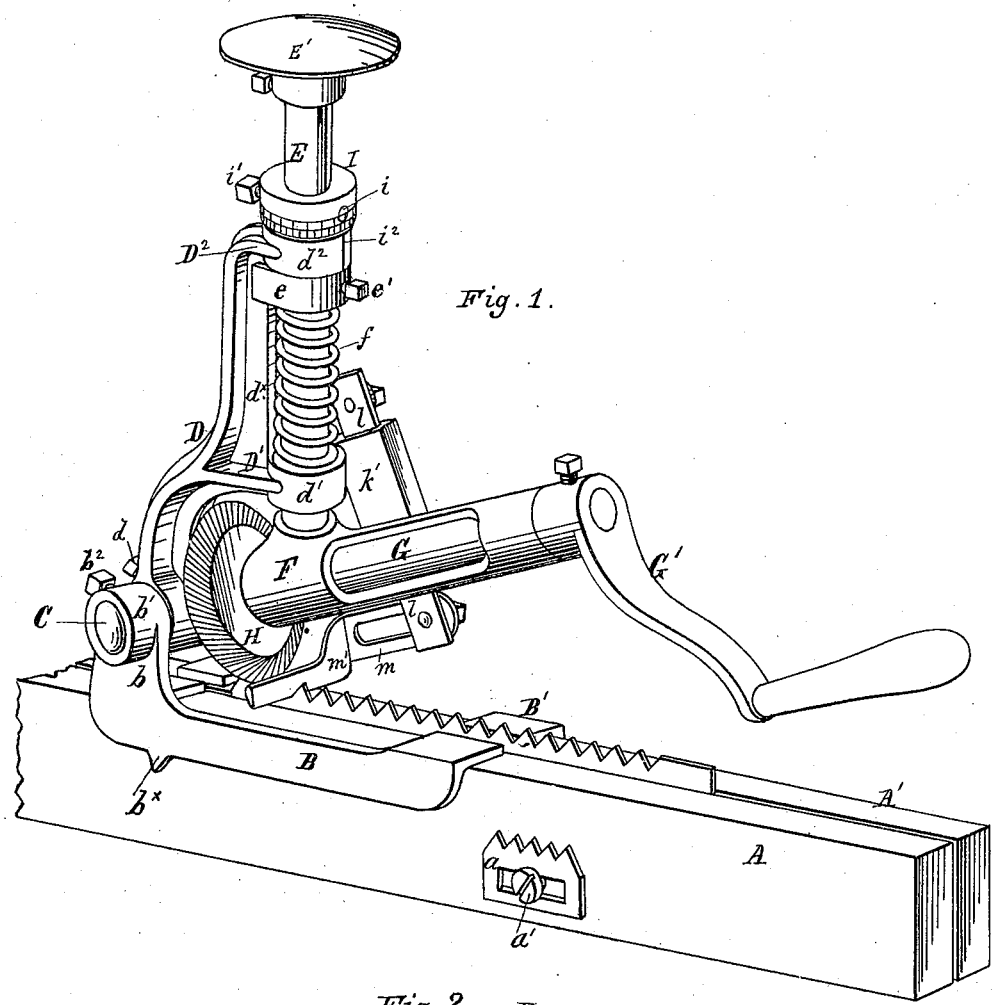
Figure 2:
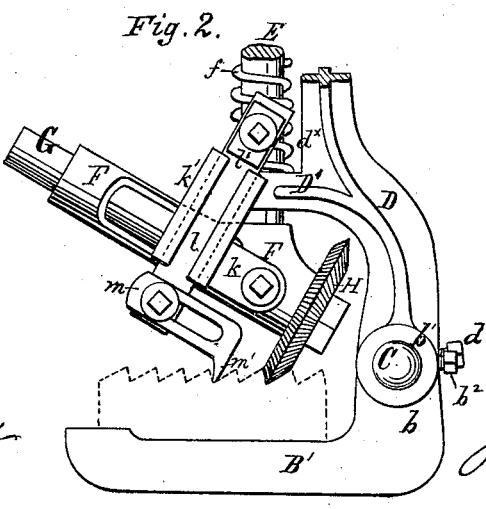

Figure 1 represents a perspective view of my improved saw gummer and sharpener; and Fig. 2 is a side elevation of a portion of the same.

Similar letters of reference denote corresponding parts in both figures.

My invention relates to a novel organization of saw gumming and filing machines, adapting it to be readily adjusted to and controlled in its action upon the saw to be sharpened, in such manner that a saw may be readily gummed and sharpened with entire precision, whether in the hands of the unskilled or of the expert, as hereinafter explained.

In the accompanying drawings, A A' represent a pair of clamps, between which the saw is clamped while being operated upon. Near one end of the bar A is secured a short plate, $a$, provided with teeth on its upper edge, matching in length or distances apart the teeth of the saw, secured between the clamp-bars. These plates, of which there may be a number to correspond with the different lengths of the teeth in different saws, are slotted, to permit their longitudinal adjustment to suit the position of the saw-teeth, and are secured or held at the desired adjustment by a thumb or set screw, $a'$. Upon the bars A A is placed a carriage, composed of two parallel angle irons or plates, B B', which rest upon and embrace the clamp-bars A A' between them, said plates having at one end uprights or ears $b$, provided with sleeves $b^1$, through which, by means of a through rod or shaft, C, the plates B B' are connected, being held at the required distance apart and in a parallel relation to each other by set-screws $b^2$. Upon the rod or shaft C, between the ears or sleeves $b^1$, is mounted an upright, D, secured upon the rod C in the desired relation to the plates by a set-screw, $d$. The upper end of this standard or upright is forked, or has horizontal arms $D^1 D^2$ formed upon it, provided at their ends with sleeves $d^1 d^2$, in which is mounted a vertically-sliding rod, E, which has an inclined sleeve, F, attached rigidly to its lower end, said sleeve forming a bearing for the shaft G, to the lower inner end of which the circular file or sharpening-wheel H is attached, the outer end of said shaft having a band or gear-wheel or a crank, G', attached for imparting a rotary movement to the shaft and sharpening-wheel.

When gearing is employed for driving the file-wheel shaft greater range of adjustability of the pitch of the teeth is provided for.

The upright D, by preference, is made in the form of a + or angle-iron for giving the required strength with the least possible weight of material, and the vertical inner rib $d^\times$, adjacent to the rod E, serves as a track or way for an adjustable collar, $e$, secured to the rod E between the guide-sleeves $d^1 d^2$ by a set-screw, $e'$. This collar $e$ has a notch or fork upon its inner face, adjacent to the standard D, which strides the rib $d^\times$, and prevents the collar from being rotated, while permitting its free vertical movement with the rod E. Between the sleeve $d^1$ and the collar $e$ is a spring, $f$, surrounding the rod E, which serves by its tension to uphold the rod with the adjustable collar $e$ resting against the sleeve $d^2$; or, if preferred, the collar may be placed below the spring, in which case the spring would tend to force the rod E downward to the extent of its throw, or until the collar rested upon the sleeve $d^1$, thus adapting it to produce the feed movement of the sharpening-wheel hereinafter described. Above the arm, $D^2$, and sleeve $d^2$ another adjustable collar, I, is secured to the rod E, a pin or spur at $i$ passing through or formed upon the collar, and entering a vertical groove in said rod, preventing the rotation of the collar relatively to the rod, while permitting its vertical adjustment thereon. The collar I is held at the desired point of adjustment upon the rod E by a set-screw, $i^1$, and serves, in connection with the collar $e$, to regulate the throw or extent of movement of the rod E and sharpening-wheel H, to be governed by the depth of the teeth of the saw operated upon. The collar has a scale formed or cut upon it, a line at $i^2$, on the sleeve $d^2$, serving as an index to the angle of rotation of the shaft C and wheel H to the plane of the saw, the set-screw $e'$ permitting the adjustment of the rod E with its collar I and of the shaft and wheel H connected therewith for giving the desired bevel to the saw-teeth. The desired pitch of the saw-teeth is secured by adjusting the standard D upon the shaft or rod C by means of the thumb or set screw $d$. The sleeve F, at or near its lower end, has secured to it an arm, $k$, the outer end of which is provided with an inclined sleeve or partial sleeve, $k'$, in which is mounted a slide-bar, $l$, having at its upper end an adjustable block or plate, $l'$, which prevents said bar from dropping out and regulates its throw.

To the lower end of the slide $l$ is secured, by means of a set-screw, a slotted plate or arm, $m$, provided at its lower inner end with an angular foot piece or gage, $m'$, which crosses the plane and enters between the teeth of the saw, serving, by its relation to the file-wheel, to determine the position of the latter in its action on the teeth of the saw. In operation, the saw being secured between the clamp-bars A A, as shown, the carriage B B' is placed on said bars, and a spur, $b^\times$, formed on one part, B, enters between the first and second teeth of the notched plate $a$, which is adjusted to bring the file-wheel into position to act upon the first tooth of the saw, said spur serving to hold the carriage while said tooth is being operated upon. When this is done the carriage is moved forward until the spur $b^\times$ rests between the third and fourth teeth of the plate $a$, bringing the sharpening-wheel into position to act upon the third tooth of the saw, where the teeth are alternately beveled in opposite directions.

The gage or foot piece $m'$ is now adjusted to set at the bottom of the notch formed between the first and second teeth of the saw, when, the third tooth being sharpened, said foot-piece serves in the further forward movement of the carriage to accurately gage and determine the position of the sharpening-wheel, and the plate $a$ is no longer required until the carriage is returned and the file adjusted for acting on the alternate teeth, when the spur $b^\times$ is placed between the second and third teeth of the plate $a$, bringing the file into proper position to act upon the second tooth of the saw. This being done, the carriage B B' is moved forward until the foot $m'$ rests between the second and third teeth of the saw, when the plate $a$ is no longer needed. By this arrangement, only short sections of four or five teeth, corresponding to those of the saw to be operated upon, are required for the plates $a$, the foot-piece $m'$ acting as the gage for the file-wheel after it has been set by the aid of the toothed plate $a$, as explained.

The rod E is pressed down by the hand of the attendant resting upon the knob or handle E', and carries the sharpening-wheel H with it, until the first tooth is cut to the desired depth, when, the collar I being adjusted to rest snugly on the sleeve $d^2$, the remaining teeth will be cut to the same uniform depth by pressing the rod downward each time until the collar rests on said sleeve. After a tooth is sharpened, and pressure is removed from the knob E, the spring $f$ raises the rod E until the collar $e$ rests against the sleeve $d^2$, in which position the sharpening-wheel and gage $m'$ are raised clear of the teeth, permitting the advancing movement of the carriage B B', as explained. Where the action of the spring $f$ is reversed, as referred to, the feeding movement of the sharpening-wheel will be effected by the spring, and the wheel will be withdrawn by lifting on the knob or handle E'. The operation of the parts for adjusting the sharpening-wheel to give the required pitch and bevel to the saw-teeth will be understood without further description. The file or sharpening wheel H may be of any material usually employed for the purpose, and of any preferred form or pattern.

Having now described my invention, what I claim as new, and desire to secure by Letters Patent, is—

1. The combination, with the clamping-bars and traveling-carriage B B', of the adjustable toothed plate $a$, for setting the traveling-gage or foot-piece $m'$, substantially as described.

2. The traveling-carriage B B', in combination with the standard D and sliding rod E, carrying the sharpening-wheel, arranged and operating substantially as described.

3. The combination, with the sliding rod E, carrying the sharpening-wheel, as described, of the collars $e$ and I for gaging the depth of the teeth.

4. The combination, with the sliding rod E, of the collars $e$ and I and spring $f$, arranged and operating as described, and for the purpose set forth.

5. The collar I, on the sliding and turning rod E, provided with the scale for regulating the adjustment of the rod and sharpening-wheel and the bevel of the saw-teeth, as described.

JAMES McSWEENY.

Witnesses:
JOSEPH DALY,
CHESTER HEMENWAY.